(No Model.)
F. W. & T. L. SPERRY.
SHAFT SUPPORTER.
No. 371,857. Patented Oct. 18, 1887.
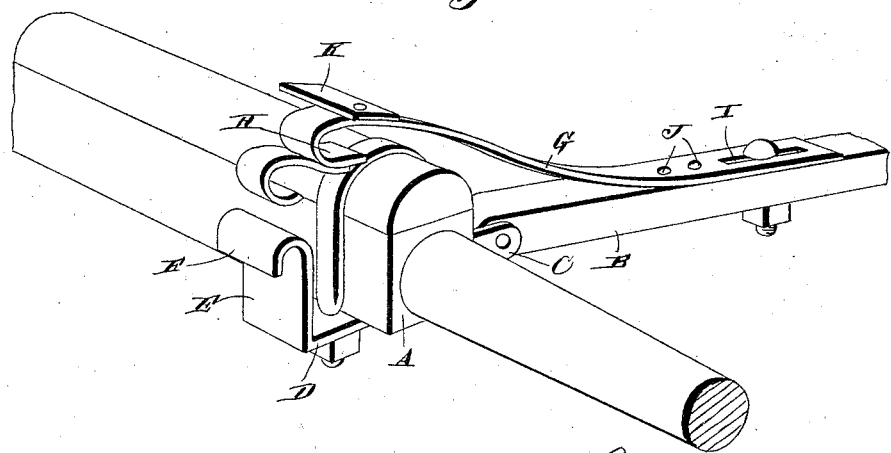
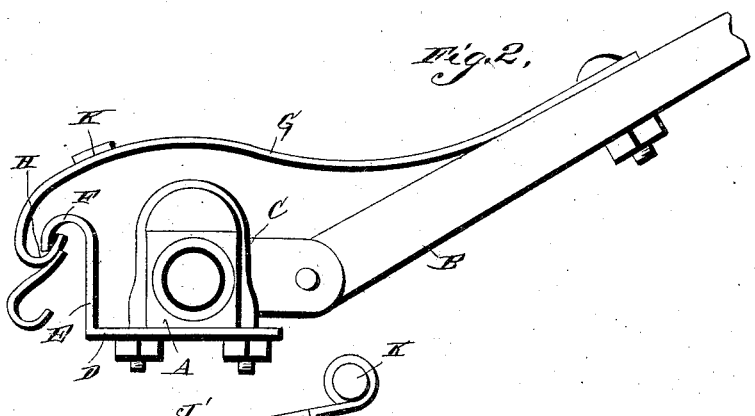
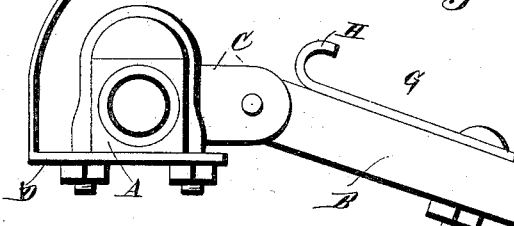
Fred W. Sperry and
Thomas L. Sperry.
INVENTORS
WITNESSES
Attorneys.

United States Patent Office.

FRED. WILLIAM SPERRY AND THOMAS LOWREY SPERRY, OF SPARTA, TENNESSEE.

SHAFT-SUPPORTER.

SPECIFICATION forming part of Letters Patent No. 371,857, dated October 18, 1887.

Application filed August 10, 1887. Serial No. 246,596. (No model.)

*To all whom it may concern:*

Be it known that we, FRED. WILLIAM SPERRY and THOMAS LOWREY SPERRY, citizens of the United States, residing at Sparta, in the county of White and State of Tennessee, have invented new and useful Improvements in Shaft-Supporters, of which the following is a specification.

Our invention relates to improvements in buggy-shaft supporters; and it consists in certain novel features, hereinafter described and claimed.

In the accompanying drawings, which fully illustrate our invention, Figure 1 is a perspective view of a portion of a shaft and axle having our improved device applied thereto. Fig. 2 is a side elevation showing the shaft raised, and Fig. 3 shows a modification.

Referring to the drawings by letter, A indicates the axle, B, the shaft or thill, and C the thill-coupling, all of the usual construction. The clip-plate D, by which the thill-coupling is secured to the axle, is provided at its rear end with the vertical projection E, having the hook F at its upper end.

G designates a plate secured to the upper side of the shaft at the end of the same, and provided at its end with a hook, H, which engages with the hook F when the shaft is raised, as shown in Fig. 2. This plate G is secured on the shaft by means of a bolt passed through a longitudinal slot, I, in its outer end, which holds it until it is adjusted to the proper position, after which it is firmly secured in place by means of bolts passed through the holes J J and the shaft.

In the construction shown in Figs. 1 and 2 the hook F is turned backward and the hook H downward, while in Fig. 3 the plate G is made considerably shorter and the hook turned upward, and the hook F is formed on the upper end of an extension, J', and is turned forward. The plate G, in Figs. 1 and 2, and the extension J', in Fig. 3, are provided with handles or offsets K, which are used in disengaging the parts.

The operation and advantages of our device will, it is thought, be understood from the foregoing description and the annexed drawings without a detailed description of the same.

When the shafts are raised, the hooks F and H engage, and the shafts are thus supported until the horse is harnessed and placed in proper position in front of the vehicle. The hooks are then disengaged and the shafts dropped into position.

Having thus described our invention, what we claim, and desire to secure by Letters Patent, is—

1. The combination of the plate secured to the axle and having the hook F and the plate G secured to the shaft, and having the hook H engaging the hook F, one of said plates being provided with a laterally-projecting handle, K, substantially as specified.

2. The combination of the thill-coupling having the hook F and the plate G attached to the shaft or thill, longitudinally adjustable thereon, and having the hook H, adapted to engage the hook F, for the purpose set forth, substantially as described.

In testimony that we claim the foregoing as our own we have hereunto affixed our signatures in presence of two witnesses.

FRED. WILLIAM SPERRY.
THOMAS LOWREY SPERRY.

Witnesses:
M. A. CUMMINGS,
JOHN PRICE.